United States Patent [19]

Smith

[11] Patent Number: 4,533,971

[45] **Date of Patent: * Aug. 6, 1985**

[54] SHORTING CAGE FOR PROTECTOR WELLS

[75] Inventor: Thomas J. Smith, Bay Shore, N.Y.

[73] Assignee: TII Industries, Inc., Copiague, N.Y.

[ * ] Notice: The portion of the term of this patent subsequent to Sep. 28, 1999 has been disclaimed.

[21] Appl. No.: 495,102

[22] Filed: May 16, 1983

[51] Int. Cl.[3] .................... H02H 3/22

[52] U.S. Cl. .................... 361/119; 361/124

[58] Field of Search .................... 361/119, 124, 117, 120, 361/126

[56] References Cited

U.S. PATENT DOCUMENTS 4,351,015 9/1982 Smith .................... 361/119

*Primary Examiner*—Harry E. Moose, Jr.

*Attorney, Agent, or Firm*—Sachs & Sachs

[57] ABSTRACT

A shorting cage is provided in a telephone terminal housing having a protector well so that when the protector cartridge is removed from its cooperating well, the shorting mechanism in the form of a cage will cause the line to remain shorted until a replacement protector cartridge, with the protective device included therein, is reinserted into the terminal well. Replacing the protector cartridge into the well without a protective device disposed therein will not remove the line short.

12 Claims, 9 Drawing Figures

SHORTING CAGE FOR PROTECTOR WELLS

BACKGROUND OF THE INVENTION

1. Field of the Invention

The present invention relates to electrical overvoltage protectors, sometimes referred to as electrical surge protectors or lightning arresters, used to protect telephone transmission lines against voltage surges, and more particularly, relates to a shorting cage inserted in the arrester housing that permits a fail-safe short to occur upon removal of the overvoltage protective device.

2. Description of the Relevant Art

Surge arresters or protective devices known in the prior art generally include a housing that contains a pair of spaced apart electrodes and a means for maintaining a protector cartridge between the electrodes. The protector cartridge may contain a pair of spaced apart carbon electrodes that define an arc or a discharge gap therebetween in order to ground excessive line voltages so as to protect both the equipment on the line and the line itself. With repeated overvoltage conditions and discharges, the carbon gap loses its effectiveness and a gas tube in parallel therewith may also fail with continued use. Typical of these arresters, which may include fusing links and internal shorting mechanisms so that when an overvoltage occurs, the fusing link melts permitting a short to occur from the line electrode to ground, are U.S. Pat. Nos. 4,128,855 issued to Gilberts on Dec. 5, 1978; Re. 29,391 issued to Kawiecki on Sept. 6, 1977; 4,002,952 issued to Menninga on Jan. 11, 1977; 3,703,665 to Yereance, et al on Nov. 21, 1972 and 4,351,015 issued to T. J. Smith on Sept. 21, 1982.

All of these devices operate similarly; however, each device has a common shortcoming. Upon removal of the protective device the line remains open, thereby providing no protection for the line or equipment attached thereto. All of the disclosed devices require that the protector cartridge be in position and in operating condition in order to afford the proper protection.

It is well known that when a serviceman dispatched to repair a shorted protective cartridge, upon occasion, not having a replacement protective device available will return the protector cartridge without inserting the protective device therein. This condition may cause considerable damage should an overvoltage occur on the line because there is no indication that the protective device is missing. The terminal or line when checked from the telephone line central office will read "open" and will indicate that the line is in good working order.

U.S. Pat. No. 4,351,015 attempted to overcome this shortcoming. However, in some instances the dimensions of the skirt portion of the protector cartridge could cause the line short to be removed if the protector cartridge were replaced without the protective device being included therein.

Therefore, it is an object of the present invention to provide a simple, inexpensive means for protecting telephone or other communication lines from overvoltage surges when the protective device is removed therefrom.

It is yet another object of the present invention to provide a short from line-to-ground when the protective device is removed from its receptacle in a terminal block.

It is a further object of the present invention to provide a means for the central office to determine that the protective cartridge and/or protector device has been removed from a terminal protector block until a new cartridge and protective device has been replaced therein.

It is yet another object of the present invention to prevent a serviceman from replacing a defective protector cartridge without inserting a replacement protective device therein.

SUMMARY OF THE INVENTION

An overvoltage surge arrester apparatus, according to the principles of the present invention, for protecting communication lines and equipment connected thereto from voltage surges comprises; a housing of insulating material having at least one well-type aperture disposed therein. The well-type aperture is provided with a first electrode disposed at the closed end thereof having an upwardly extending portion that is adapted to be connected to earth ground. A second electrode is disposed about the periphery of the open end of the well-type aperture and is adapted to be connected to one of the communication lines. A hollow electrically conductive shorting cage is adapted to be received into the well-type aperture. The shorting cage is in continuous intimate electrical contact with the second electrode and has at least one inwardly extending finger portion adapted to be in electrically conductive contact with the upwardly extending portion of the first electrode. A protector cartridge including an electrically conductive shell is adapted to be received into the hollow shorting cage and is in electrically conductive contact at the upper portion thereof providing electrically conductive contact with a protective device disposed within the shell. One terminal of the protective device extends downwardly beyond the shell and is adapted to be in electrical contact with the upwardly extending portion of the first electrode when in position in the shorting cage. The protective device urges the protector cartridge shell to displace the inwardly extending finger portion of the shorting cage causing it to be out of electrical contact with the upwardly extending portion of the first electrode when placed in position in the well-type aperture.

The foregoing and other objects and advantages will appear from the description to follow. In the description reference is made to the accompanying drawing which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims.

BRIEF DESCRIPTION OF THE DRAWINGS

The subject matter which I regard as my invention is particularly pointed out and distinctly claimed in the concluding portion of this specification. My invention, itself, however both as to its organization and method of operation, together with further objects and advantages thereof may best be understood by reference to the following description taken in connection with the accompanying drawing wherein like reference characters refer to like elements.

DESCRIPTION OF THE PREFERRED EMBODIMENT

Figure 1:
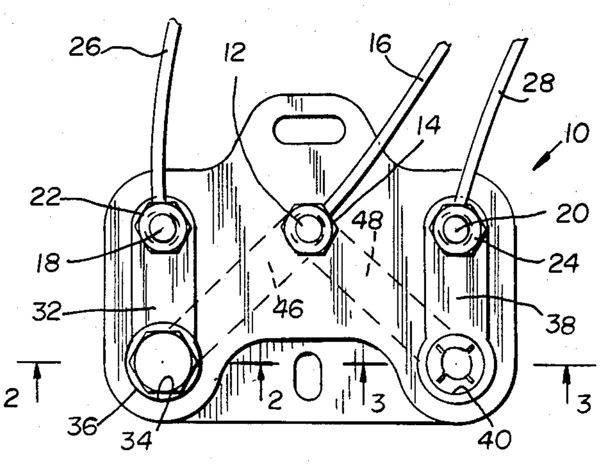
FIG. 1 is a top plan view showing a typical telephone installation for a pair of drop lines wherein each line is protected by an overvoltage arrester device and shorting cage, according to the principles of the present invention.

Referring now to the figures, and in particular, to FIG. 1, there is shown a typical telephone terminal block 10 which includes a threaded ground terminal 12 and a nut and conventional prong and flat washer 14 to which a ground wire 16 is affixed. Two additional threaded terminals 18 and 20 are provided. They have affixed thereon, in a similar manner, nuts 22 and 24 and their associated flat washers to which communication lines 26 and 28, respectively, are connected, in a conventional manner. Terminals 12, 18 and 20 are affixed, in a conventional manner, in a dielectric housing or insulating block 30 which may be fabricated from any number of well-known materials.

The protector terminal block or housing 10 is provided with an electrically conductive link 32 which extends from terminal 18 to a well-like aperture 34 provided in the block 10. The link 32 extends about the periphery 36 of aperture 34 and extends downwardly into the aperture 34 forming a continuous electrically conductive path from the upper portion of the well-type aperture to the line terminal 18. Aperture 34 is, preferably, threaded beyond the depth of the conductive link 32. In a similar manner, a conductive link 38 is provided between terminal 20 and aperture 40 which is also threaded below the depth of the link 38.

Figure 3:
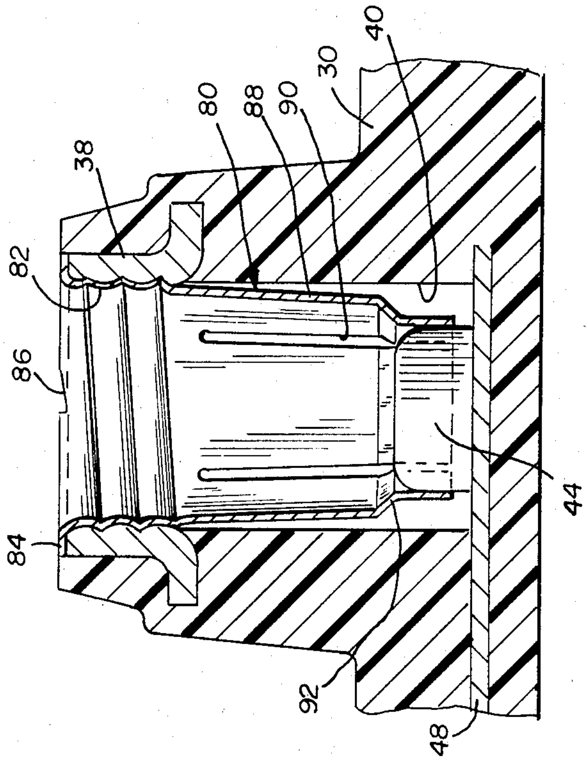
FIG. 3 is a cross-sectional view in elevation along the line 3—3 of FIG. 1 showing the position of one embodiment of a shorting cage with the protector cartridge removed from the well-type aperture.
Figure 2:
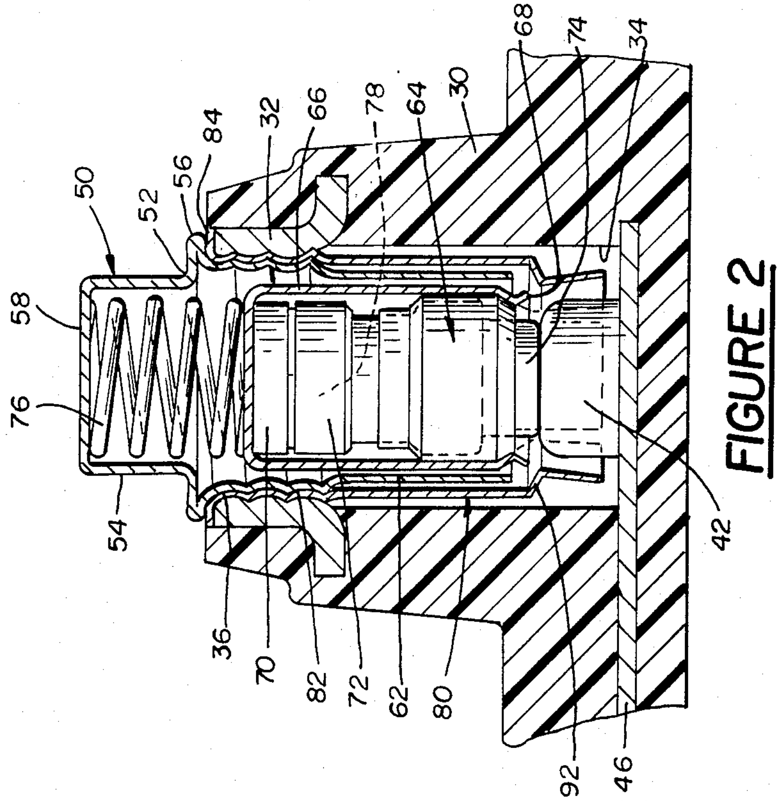
FIG. 2 is a cross-sectional view in elevation along the line 2—2 of FIG. 1 showing a protector cartridge and a shorting cage in position in the well-type aperture provided in the terminal housing of FIG. 1.

Centrally disposed in apertures 34 and 40, as is clearly shown in FIGS. 2 and 3, is an upwardly extending, electrically conductive button or protrusion 42 and 44 which is affixed, in a conventional manner, to an electrical conductor 46 and 48 (which may be combined in one piece) to provide electrical contact to the ground terminal 12.

Figure 9:
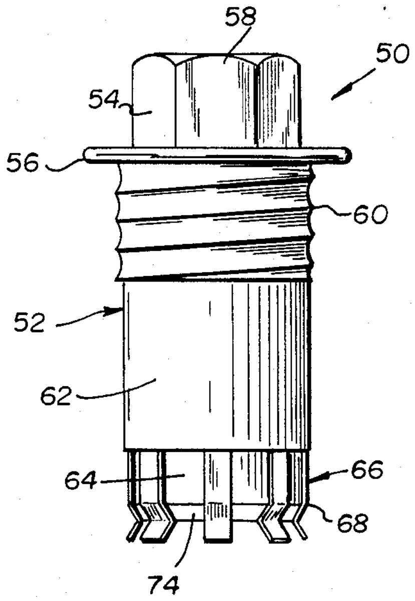
FIG. 9 is an end view in elevation of a protector cartridge having a protective device disposed therein.

A protector cartridge 50 is shown in FIG. 9 and is shown in cross-section and in position in a protector well or aperture 34, in FIG. 2. The protector cartridge 50 includes an electrically conductive shell 52 which is provided with a cap portion 54 that is hexagonally shaped, and has annular radial flange 56 that is axially spaced from an end wall 58 of the cap 54. The cap 54 further includes a threaded, cylindrically-shaped wall portion 60 and a depending cylindrical skirt portion 62 adjacent to and extending axially from the thread portion 60. The skirt 62 is relatively long and terminates in an open end of the cap portion 54.

Internally disposed within the protector cartridge shell 52 is a protective device 64 which, preferably, is a gas tube manufactured by TII Industries, Incorporated known as Model No. 362 or 364.

The protective device 64 is centrally disposed within a retaining cage 66 which is cylindrically-shaped and provided with a plurality of fingers 68 formed to retain the protective device 64 therewithin when the protector cartridge 50 is removed from the well 34. Additionally included in the retaining cage 66, are solder pellets and/or a disc 70, especially chosen to melt with excessive current flowing therethrough because of the excessive heat generated thereby, and a tube end cap clip 72. When the protective device 64 is in position with the solder disc 70 in position, one terminal 74 of the protective device 64 extends beyond the fingers 68 of retaining cage 66 permitting electrically conductive contact with the button or protrusion 42. A coil spring 76 urges the retaining cage 66 against disc 70 and clip 72 which are in intimate contact with the second terminal 78 of protective device 64. Thus, if disc 70 were to melt because of overheating, spring 76 would urge cage 66 into electrical contact with button 42 by pressing fingers 68 thereagainst and would maintain this shorted position until the protector cartridge 50 is removed from the protector well 34 by a service technician.

Disposed between the protector cartridge 50 and the threaded periphery 36 of link 32 is a shorting cage 80, which is fabricated from an electrically conductive material such as copper, or the like, and is provided with a threaded upper portion 82 terminating and adjacent to a horizontal peripheral flange 84 that is provided with a detent 86 or retaining edge, whose function will be described hereinafter. When in position, the shorting cage 80 is in intimate electrical contact with link 32 and shell 52; and, via spring 76, retaining cage 66, and disc 70 and end cap clip 72, with terminal 78 of protective device 64. Shorting cage 80 is, preferably, provided with a plurality of fingers 88 which extend downwardly beyond skirt portion 62 of protector cartridge 50 and are adjacent to the threaded portion 82. When the shorting cage 80 is inserted into protector well or aperture 40, shown in FIG. 3, without the protective device 64 inserted therein, the fingers 88 flex inwardly until they provide electrically conductive contact with the button 44. The preformed tendency for the fingers 88 to move inwardly is provided by incorporating a plurality of slots 90 in the lower portion of shorting cage 80.

When the protector cartridge 50, with protective device 64 disposed therein, is inserted within the hollow shorting cage 80 and threaded therein until the shorting cage seats its flange in electrical contact with link 32 or 38 and the flange 56 of shell 52 is seated and in contact with link 32, the finger portion of shorting cage 80 is urged outwardly out of electrical contact with button 42 as is shown in FIG. 2.

In operation, the shorting cage 80 will be inserted into protector well 34 or 40 upon removal of the protector cartridge 50 and threaded therein until it becomes seated. Thereafter, protector cartridge 50 will be threaded into the shorting cage 80 until flange 56 seats against the flange 84 on the shorting device until it causes the flexing of detent 86 or alternatively the flange 56 may be pierced on installation to form detent 86. Thereafter, should the protector cartridge 50 be removed because of failure thereof, the shorting cage 80 will be caused to remain in the aperture 34 or 40 by virtue of the detent means retaining the shorting cage therein as the protector cartridge 50 is unscrewed therefrom. If the protector cartridge 50 is not reinserted into the aperture, or if the protective device 64 is not replaced, or if protector cartridge 50 is replaced without a protective device 64, a short will be caused to occur between the line 26 or 28 and ground, thereby indicating to the central office that the communication line is inoperative. Thus, there is provided a fail-safe protection for the communication line until an operating protector cartridge with a protective device therein is properly inserted in the protector well.

Figure 4:
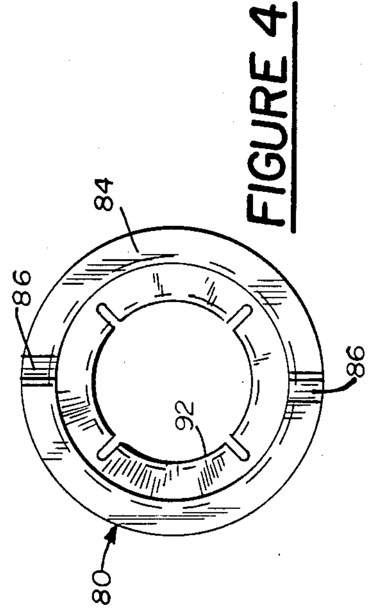
FIG. 4 is a top plan view of a shorting cage showing the retaining means and extending finger portion without a protector cartridge disposed therein.

FIG. 4 shows a top plan view of the shorting cages disclosed herein. The only difference in both embodiments is the angle and shape of the curved portion or shelf 92 provided proximate the end of skirt portion 62 of the shorting cage 80 or 80'.

Figure 5:
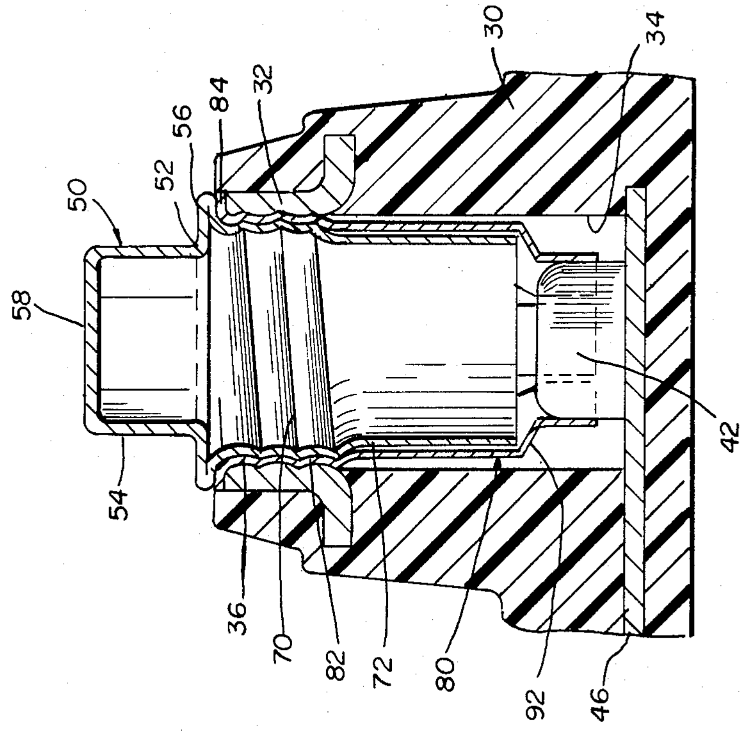
FIG. 5 is a cross-sectional view in elevation similar to that shown in FIG. 2 without a protective device included in the protector cartridge.

FIG. 5 shows the position of the shorting cage 80 when a protector cartridge 50 is inserted therein in a well 34 without having a protective device 64 disposed within the protector cartridge. The fingers 68 assume their natural position and are in electrical contact with button contact 42 providing a short between the communication lines as discussed hereinbefore.

Figure 8:
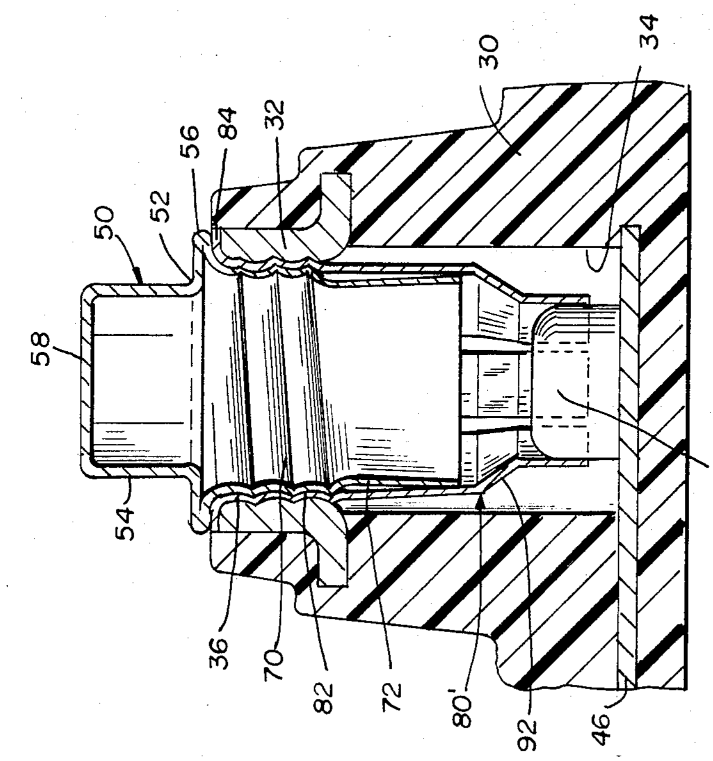
FIG. 8 is a cross-sectional view in elevation similar to that shown in FIG. 5 utilizing the alternative embodiment of a shorting cage including a protector cartridge without the protective device included therein.
Figure 7:
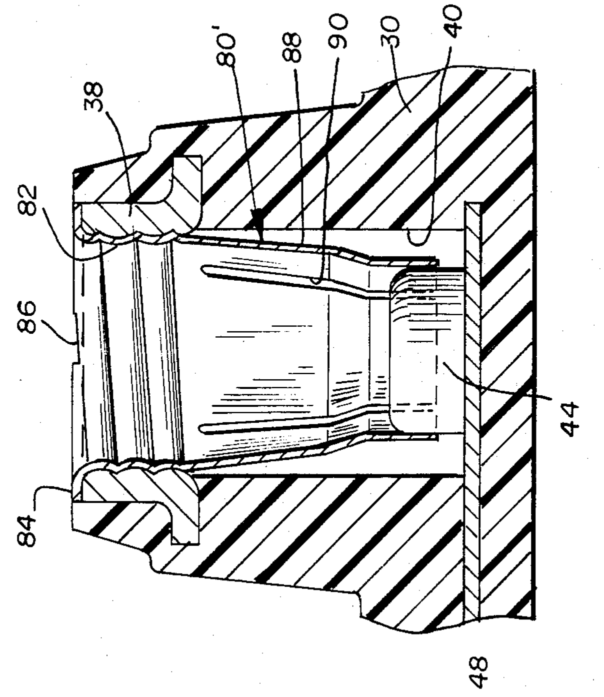
FIG. 7 is a cross-sectional view in elevation similar to that shown in FIG. 3, disclosing an alternative embodiment of a shorting cage with the protector cartridge removed from the well-type aperture.
Figure 6:
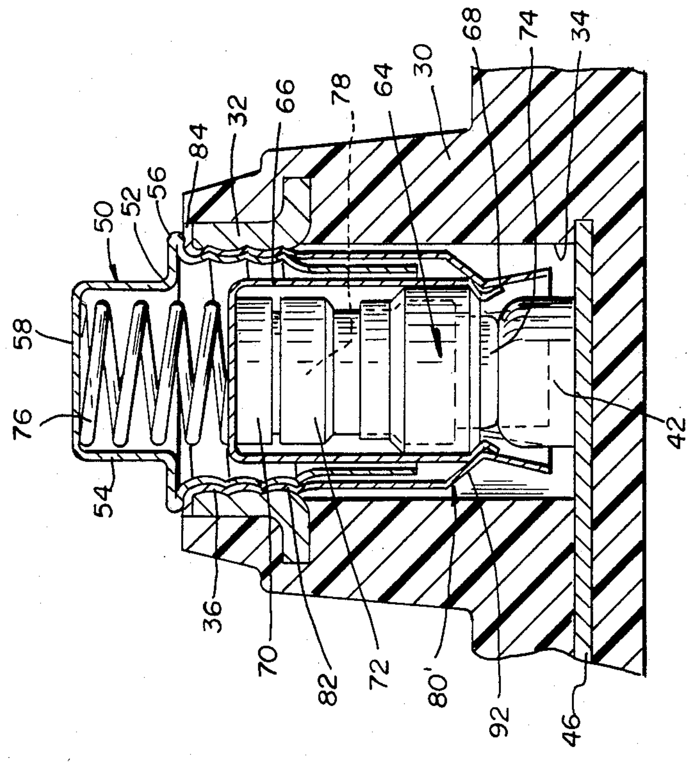
FIG. 6 is a cross-sectional view in elevation similar to that shown in FIG. 2 with a protector cartridge provided with a shorter skirt portion.

Referring now to FIG. 6, which is a view similar to that shown in FIG. 2 and has therein an alternative embodiment of a shorting cage 80' suitable for use with a protector cartridge 50 having a shell 52 with a skirt portion 62 that is relatively short. With the arrangement of the shelf portion 92 on the shorting cage 80' as shown, the protective device 64 when within the protector cartridge 50 disposed within aperture 34 will cause the shorting cage to be out of contact with protrusion 42 thereby opening up the short circuit which would occur if the protective device 64 were not present and/or the protector cartridge 50 were removed from the protector well 34. This can be best seen by referring to FIG. 7 which shows the shorting cage 80' without the protector cartridge 50 inserted therein and FIG. 8 which shows the protector cartridge 50 inserted without the protective device 64 disposed therein. Thus, it can be readily seen that the shape of the shelf or lip 92 provided in shorting cage 80' requires that the protective device 64 be inserted in the protector cartridge 50 in order to prevent the shorting cage to contact terminal 42 or 44. As explained hereinbefore, the protective device 64 when inserted into retaining cage 66 causes retaining cage 66 to expand and therefore apply pressure to the shelf portion 92 provided on the skirt portion 62 of the shorting cage 80'. Similarly, as configured, the shorting cage 80 requires the insertion of the protective device 64 in order to prevent contact with the protrusion of terminals 42 and 44.

Hereinbefore has been disclosed a fail-safe shorting cage which may be utilized in conjunction with protector terminals to prevent the terminals from being left without protective devices being inserted therein. It will be understood that various changes in the details, material, arrangement of parts and operating conditions which have been herein described and illustrated in order to explain the nature of the invention may be made by those skilled in the art within the principles and scope of the instant invention.

Having thus set forth the nature of the invention, what is claimed is:

1. An overvoltage surge arrester apparatus for protecting communication lines and equipment connected thereto from voltage surges comprising:

(a) a housing of insulating material having at least one well-type aperture disposed therein, said well-type aperture being provided with a first electrode adapted to be connected to earth ground and disposed at the closed end thereof having an upwardly extending portion and a second electrode disposed about the periphery of the open end of said well-type aperture, said second electrode being adapted to be connected to one of said communication lines;

(b) a hollow, electrically conductive shorting cage adapted to be received into said well-type aperture, said shorting cage being in continuous intimate electrical contact with said second electrode and having at least one inwardly extending finger portion adapted to be in electrically conductive contact with said upwardly extending portion of said first electrode; and (c) a protector cartridge including an electrically conductive shell adapted to be received into said hollow shorting cage and be in electrically conductive contact at the upper portion thereof providing electrically conductive contact with a protective device disposed within said shell, one terminal of said protective device extending downwardly beyond said shell and being adapted to be in electrical contact with said upwardly extending portion of said first electrode when in position in said shorting cage, said protective device urging said protector cartridge shell to displace the inwardly extending finger portion of said shorting cage causing it to be out of electrically conductive contact with said upwardly extending portion of said first electrode when in position in said well-type aperture.

2. An overvoltage surge arrester according to claim 1 wherein said second electrode is provided with a threaded portion and is adapted to receive and cooperate with a threaded portion provided at the upper portion of said shorting cage, and said shorting cage threaded portion is also adapted to receive a threaded portion provided on the shell of said protector cartridge.

3. An overvoltage surge arrester according to claim 1 wherein said shorting cage is provided with a plurality of inwardly extending finger portions.

4. An overvoltage surge arrester according to claim 1 wherein said shorting cage is provided with means for accurately determining its depth within said well-type aperture.

5. An overvoltage surge arrester according to claim 1 wherein said shorting cage includes retaining means for retaining said cage in position in said well-type aperture when said protector cartridge is removed therefrom.

6. An overvoltage surge arrester according to claim 1 wherein said protector cartridge shell further includes a retaining cage, for removably retaining said protective device within said protector cartridge when said protector cartridge is removed from said well-type aperture.

7. An overvoltage surge arrester according to claim 6 wherein said protector cartridge shell and said retaining cage are unable to displace said shorting cage to be out of electrical contact with said upwardly extending portion of said first electrode when in position in said well-type aperture without said protective device being disposed within said protector cartridge.

8. An overvoltage surge arrester according to claim 6 wherein said protector cartridge shell is unable to displace said shorting cage to be out of electrical contact with said upwardly extending portion of said first electrode when in position in said well-type aperture without said protective device being disposed within said protector cartridge.

9. An overvoltage surge arrester according to claim 6 wherein said retaining cage is unable to displace said shorting cage to be out of electrical contact with said upwardly extending portion of said first electrode when in position in said well-type aperture without said protective device being disposed within said protector cartridge.

10. An overvoltage surge arrester apparatus for providing communication lines and equipment connected thereto from voltage surges having a housing of insulating material with at least one well-type aperture disposed therein, said well-type aperture being provided with a first electrode disposed at the closed end thereof having an upwardly extending portion adapted to be connected to earth ground and a second electrode disposed about the periphery of the open end of said well-type aperture, said second electrode being adapted to be connected to one of said communication lines and a protector cartridge including an electrically conductive shell adapted to be received into said well-type aperture and be in electrically conductive contact at the upper portion thereof providing electrically conductive contact with a protective device disposed within said shell, one terminal of said protective device extending downwardly and being adapted to be in electrical conductive contact with said upwardly extending portion of said first electrode when in position in said well-type aperture, the improvement comprising, a hollow, electrically conductive shorting cage adapted to be received into said well-type aperture disposed between said second electrode and said protector cartridge shell, said shorting cage being in continuous intimate electrical contact with said second electrode and having at least one inwardly extending finger portion adapted to be in electrically conductive contact with said upwardly extending portion of said first electrode, said protector cartridge having one terminal of said protective device extending downwardly beyond said shell and being in contact with the upwardly extending portion of said first electrode and displacing said shorting cage finger portion out of contact with said first electrode extending portion when said protective cartridge, having said protective device disposed therein, is in position.

11. The overvoltage surge arrester apparatus according to claim 10 wherein said shorting cage is provided with a threaded upper portion adapted to mate and cooperate with threaded portions provided on said second electrode and said protector cartridge shell.

12. An overvoltage surge arrester apparatus according to claim 10 wherein said shorting cage is provided with retaining means for retaining said cage in position in said well-type aperture when said protector cartridge is removed therefrom.

* * * * *